(12) United States Patent
Samworth

(10) Patent No.: US 8,717,627 B2
(45) Date of Patent: May 6, 2014

(54) METHOD FOR ASSIGNING PRE-PRESS CURVES

(75) Inventor: Mark Samworth, Wilmington, DE (US)

(73) Assignee: Esko Software BVBA, Ghent (BE)

( * ) Notice: Subject to any disclaimer, the term of this patent is extended or adjusted under 35 U.S.C. 154(b) by 349 days.

(21) Appl. No.: 13/062,668

(22) PCT Filed: Sep. 8, 2009

(86) PCT No.: PCT/US2009/056192
§ 371 (c)(1),
(2), (4) Date: May 25, 2011

(87) PCT Pub. No.: WO2010/028345
PCT Pub. Date: Mar. 11, 2010

(65) Prior Publication Data
US 2011/0216374 A1    Sep. 8, 2011

Related U.S. Application Data

(60) Provisional application No. 61/191,414, filed on Sep. 8, 2008.

(51) Int. Cl.
*H04N 1/40* (2006.01)
(52) U.S. Cl.
USPC .......................................... 358/2.1; 358/504
(58) Field of Classification Search
USPC ........... 358/2.1, 1.9, 500, 502–504, 515–523, 358/529; 382/162–167
See application file for complete search history.

(56) References Cited

U.S. PATENT DOCUMENTS

| 5,260,806 | A | 11/1993 | Samworth |
| 5,953,498 | A | 9/1999 | Samworth |
| 6,064,396 | A | 5/2000 | Ouchi et al. |
| 6,272,234 | B1 | 8/2001 | Krogstad |
| 6,310,698 | B1 | 10/2001 | Samworth |
| 6,437,877 | B1 | 8/2002 | Takei |
| 7,057,766 | B1 | 6/2006 | Inoue |
| 2008/0273794 | A1 | 11/2008 | Samworth |

FOREIGN PATENT DOCUMENTS

| EP | 0 687 102 A2 | 12/1995 |
| EP | 0 859 508 A2 | 8/1998 |
| EP | 1 185 076 A1 | 3/2002 |
| EP | 1 310 376 A2 | 5/2003 |

OTHER PUBLICATIONS

Kassow, Harald, "International Search Report and Written Opinion of the International Searching Authority," Dec. 12, 2009.

*Primary Examiner* — Thomas D Lee
*Assistant Examiner* — Stephen M Brinich
(74) *Attorney, Agent, or Firm* — RatnerPrestia

(57) ABSTRACT

A method for adjusting color tones of an input digital image file to create an adjusted digital image file. A plurality of predetermined curves are provided, each curve specifying an adjusted color tone percentage output as a function of input color tone percentage and representing a combination of midpoint magnitude and contrast different than for any other curve. The method comprises selecting a curve by determining which one of the plurality of curves most closely matches at least two data points. The selected curve is then applied to the input digital image file to produce the adjusted digital image file.

39 Claims, 13 Drawing Sheets

| A | B | C | D | E | F | G | H |
|---|---|---|---|---|---|---|---|
| A20 A45 | B20 B45 | C20 C45 | D20 D45 | E20 E45 | F20 F45 | G20 G45 | H20 H45 |
| A21 A46 | B21 B46 | C21 C46 | D21 D46 | E21 E46 | F21 F46 | G21 G46 | H21 H46 |
| A22 A47 | B22 B47 | C22 C47 | D22 D47 | E22 E47 | F22 F47 | G22 G47 | H22 H47 |
| A23 A48 | B23 B48 | C23 C48 | D23 D48 | E23 E48 | F23 F48 | G23 G48 | H23 H48 |
| A24 A49 | B24 B49 | C24 C49 | D24 D49 | E24 E49 | F24 F49 | G24 G49 | H24 H49 |
| A25 A50 | B25 B50 | C25 C50 | D25 D50 | E25 E50 | F25 F50 | G25 G50 | H25 H50 |
| A26 A51 | B26 B51 | C26 C51 | D26 D51 | E26 E51 | F26 F51 | G26 G51 | H26 H51 |
| A27 A52 | B27 B52 | C27 C52 | D27 D52 | E27 E52 | F27 F52 | G27 G52 | H27 H52 |
| A28 A53 | B28 B53 | C28 C53 | D28 D53 | E28 E53 | F28 F53 | G28 G53 | H28 H53 |
| A29 A54 | B29 B54 | C29 C54 | D29 D54 | E29 E54 | F29 F54 | G29 G54 | H29 H54 |
| A30 A55 | B30 B55 | C30 C55 | D30 D55 | E30 E55 | F30 F55 | G30 G55 | H30 H55 |
| A31 A56 | B31 B56 | C31 C56 | D31 D56 | E31 E56 | F31 F56 | G31 G56 | H31 H56 |
| A32 A57 | B32 B57 | C32 C57 | D32 D57 | E32 E57 | F32 F57 | G32 G57 | H32 H57 |
| A33 A58 | B33 B58 | C33 C58 | D33 D58 | E33 E58 | F33 F58 | G33 G58 | H33 H58 |
| A34 A59 | B34 B59 | C34 C59 | D34 D59 | E34 E59 | F34 F59 | G34 G59 | H34 H59 |
| A35 A60 | B35 B60 | C35 C60 | D35 D60 | E35 E60 | F35 F60 | G35 G60 | H35 H60 |
| A36 A61 | B36 B61 | C36 C61 | D36 D61 | E36 E61 | F36 F61 | G36 G61 | H36 H61 |
| A37 A62 | B37 B62 | C37 C62 | D37 D62 | E37 E62 | F37 F62 | G37 G62 | H37 H62 |
| A38 A63 | B38 B63 | C38 C63 | D38 D63 | E38 E63 | F38 F63 | G38 G63 | H38 H63 |
| A39 A64 | B39 B64 | C39 C64 | D39 D64 | E39 E64 | F39 F64 | G39 G64 | H39 H64 |
| A40 A65 | B40 B65 | C40 C65 | D40 D65 | E40 E65 | F40 F65 | G40 G65 | H40 H65 |
| A41 A66 | B41 B66 | C41 C66 | D41 D66 | E41 E66 | F41 F66 | G41 G66 | H41 H66 |
| A42 A67 | B42 B67 | C42 C67 | D42 D67 | E42 E67 | F42 F67 | G42 G67 | H42 H67 |
| A43 A68 | B43 B68 | C43 C68 | D43 D68 | E43 E68 | F43 F68 | G43 G68 | H43 H68 |
| A44 A69 | B44 B69 | C44 C69 | D44 D69 | E44 E69 | F44 F69 | G44 G69 | H44 H69 |
| A45 A70 | B45 B70 | C45 C70 | D45 D70 | E45 E70 | F45 F70 | G45 G70 | H45 H70 |

FIG. 1

METHOD FOR ASSIGNING PRE-PRESS CURVES

CROSS REFERENCE TO RELATED APPLICATIONS

This application claims priority to provisional application No. 61/191,414, filed Sep. 8, 2008, which is incorporated herein, in its entirety, by reference.

FIELD OF THE INVENTION

The present invention relates to a method of assigning predetermined adjustment curves to correct for dot gain to achieve accurate print quality as well as accurate color management.

BACKGROUND OF THE INVENTION

In monochrome half-tone image reproduction, various shades appearing in a continuous tone original image are reproduced on paper by a single tone ink. To simulate the multiple tones in the original, the continuous tone image is converted into a half-tone image comprising a plurality of different size dots of a uniform optical is density level, as is well known in the art. Also, as is well known in the art, color images are printed using 4-color separations, where each pixel of a digital image corresponds to a combination of color and intensity represented on each of the 4 color separations. Thus, each pixel in the digital image corresponding to one of these separations is then translated into a specified dot size on a printing plate to be used for that color. The conversion of color intensity to dot size is typically represented by a generic transfer curve that takes the input of desired color tone and converts it to desired dot size in the imagesetter. Such a transfer curve may be linear (i.e. a 20% color tone equates to a dot that is 20% of the maximum dot size, and a 70% color tone equates to a dot that is 70% of the maximum dot size), or may be a curve that corresponds to some other mathematical function.

Printing of digital images is typically complicated by the phenomenon of "dot gain," in which the size of printed half-tone dots is larger than that specified by the digital image file employed by the imagesetter. Dot gain interferes with the ability to produce similar standardized colors between printing press runs. To compensate for this effect, historically, printing press users entered in specific X and Y transfer coordinates, representing on the X-axis the desired color density, expressed as a percentage of maximum color tone, and on the Y-axis, the actual color density setting (i.e. printing plate dot size) used to produce the desired color output, as depicted in FIG. 8. This practice evolved into the generation and application of press adjustment transfer curves by mathematically fitting the curve to a set of experimentally derived points, as shown in FIG. 9. Each adjustment curve is a mathematical function specifying the required dot size on the printing plate to compensate for on-press dot gain, thus resulting in a calibrated plate. The adjustment curve thus represents mapping of an input color percentage to a desired output dot size on the printing plate to produce the desired result, taking into account dot gain. Between press runs, there may be a great deal of variation. These variations depend on numerous press factors (press type, ink type, speed, paper type) as well environmental factors (temperature, humidity, etc.). As some of these conditions may change during or between press runs, the ideal press adjustment curve may change as well.

Traditionally, little has been done to correct dot gain in offset printing, because of the limited dot gain that occurs. As new printing methods have become the industry standard, however, dot gain has become an increasingly larger problem. For example, dot gain in flexographic printing may be much greater than in offset printing, requiring the use of press adjustment curves. Even in offset printing, the use of new screening technologies such stochastic screening and concentric screening have necessitated the use of adjustment curves. In many cases, users create and apply new custom curves whenever the printed image begins to deteriorate. Historically, users created custom curves for each press. These custom curves could vary from user to user and were often based on time-consuming and expensive test runs. The number of custom curves created by users has often become unmanageable, because of the number of factors and variables involved. Creation of numerous custom curves may lead to more costly, time-consuming, and laborious adjustments if the wrong curve is applied. Because it may cost thousands of dollars to create a standard press run, it can be cost- and time-prohibitive to perform numerous standard press runs.

Therefore, a system is needed that can quickly take the information from a current press run and determine the optimum adjustment curve. A system is also needed that can bring organization to the curve selection process, instead of the chaos of numerous unsynchronized custom curves.

SUMMARY OF THE INVENTION

One embodiment of the invention comprises a method for adjusting color tones of an input digital image file to create an adjusted digital image file. The method comprises providing a plurality of predetermined curves, each curve specifying an adjusted color tone percentage output as a function of input color tone percentage over a range of input and output values. Each curve also reflects a midpoint magnitude and contrast over the range of input and output values, where the midpoint magnitude comprises the adjusted color tone percentage output corresponding to an input color tone percentage of 50%. The individual curves each represent a combination of midpoint magnitude and contrast that is different from the combination for any other curve in the plurality of curves. From an input of at least two data points, each data point comprising an adjusted color tone percentage output corresponding to an input color tone percentage, the method comprises selecting a curve by determining which one of the plurality of predetermined curves most closely matches the data points. The selected curve is applied to the input digital image file to produce the adjusted digital image file.

Some embodiments of the invention further comprising producing a printed image or a printing plate from the adjusted digital image file. In some embodiments of the invention, the plurality of curves comprise multiple families of curves, each family of curves comprising a plurality of member curves identified by a midpoint magnitude of the curve.

Another embodiment of the invention comprises a computer programmed with instructions for adjusting color tones of an input digital image file to create an adjusted digital image file. The computer comprises a means, such as but not limited to a computer memory or other media for storing information, for storing a plurality of predetermined curves, each curve specifying an adjusted color tone percentage output as a function of input color tone percentage over a range of input and output values. Each curve reflects a midpoint magnitude and contrast over the range of input and output values and represents a combination of midpoint magnitude and contrast that is different from the combination for any other curve in the plurality of curves. The programmed computer further comprises means, such as any user interface known in the art, for receiving an input of at least two data points. Each data point comprises an adjusted color tone percentage and an input color tone percentage. The programmed computer further comprises means, such as a computer processor, for determining which one of the plurality of stored predetermined curves most closely matches the two or more data points. The programmed computer further comprises means, such as the same or another computer processor, for applying the selected curve to the input digital file to produce the adjusted digital image file.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the drawing are the following figures:

FIG. 1 is an exemplary view of a table of 408 identifiers for pre-press curves in accordance with an exemplary embodiment of the present invention;

DETAILED DESCRIPTION OF THE INVENTION

The inventor has found that, with an average of 8% variation within a press sheet and even more variation between press sheets, making and altering custom curves actually increases the variation measured on press. The present invention provides methods of dealing with this issue by obviating the need for custom curves.

Figure 9:
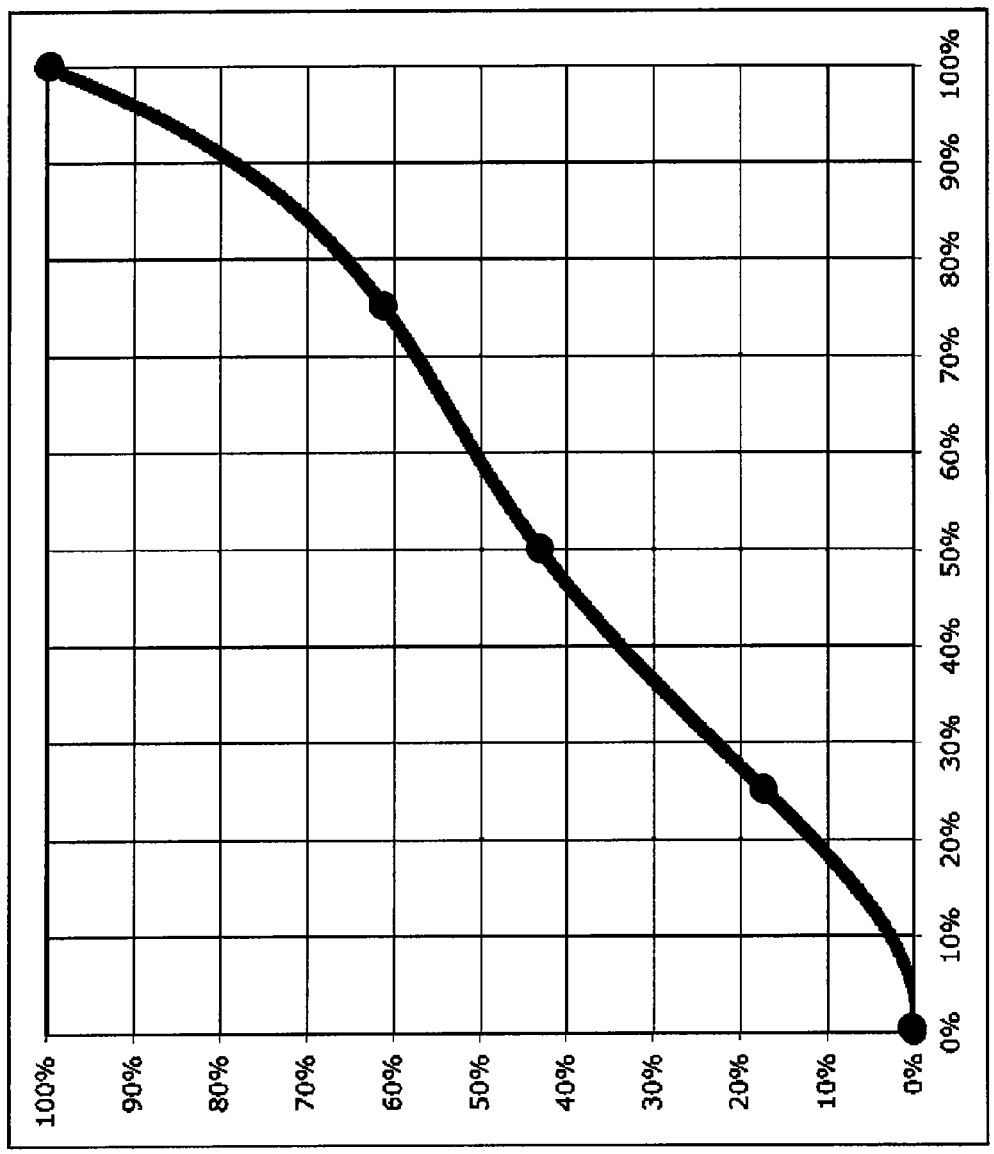
FIG. 9 depicts a curve mathematically fit to experimental results in accordance with the prior art.
Figure 10:
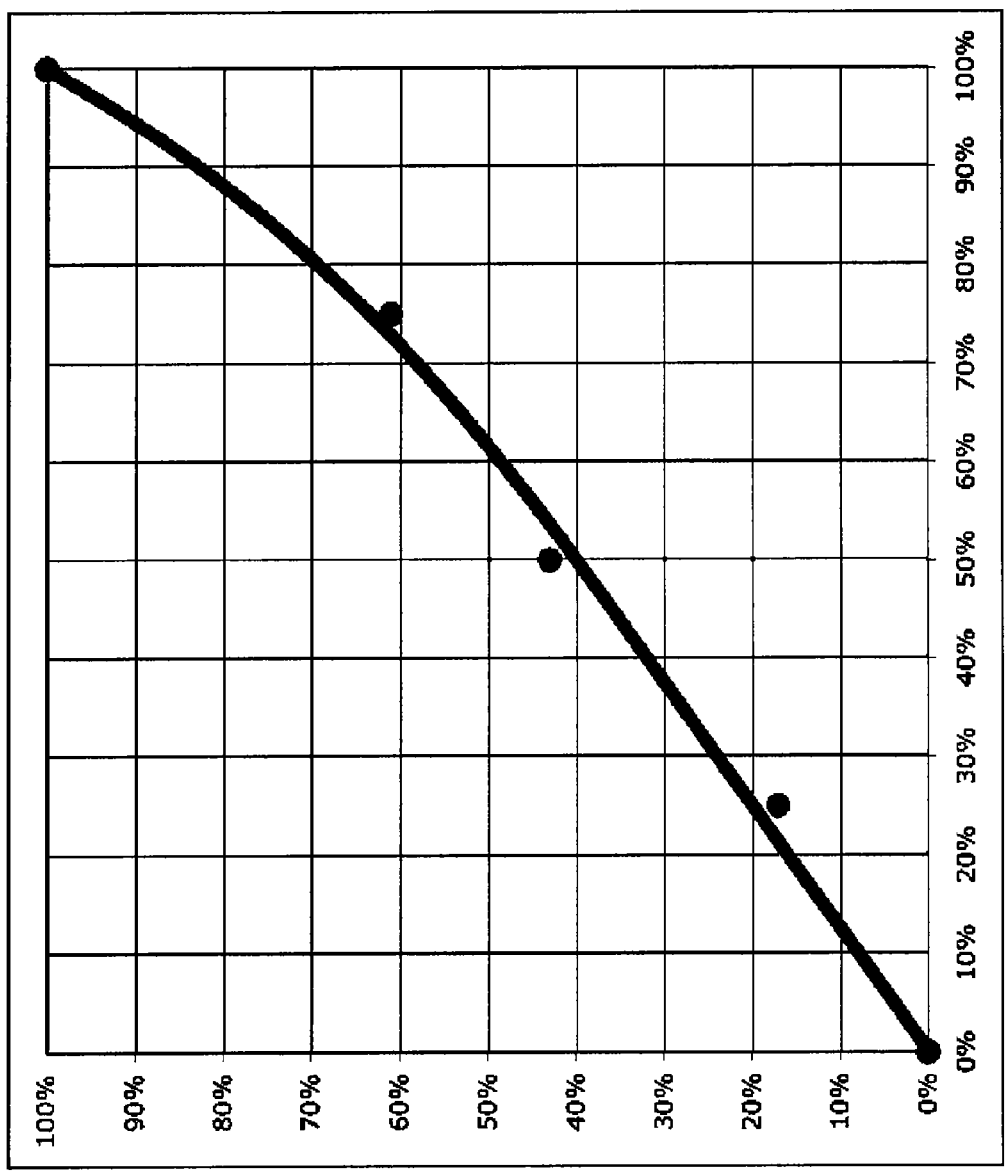
FIG. 10 depicts a predetermined curve matched to experimental results such as in accordance with the present invention.

The invention provides a system of predetermined, synchronized press adjustment curves designed to eliminate the problems associated with creating and maintaining custom curves. After taking a limited number of data points from the printed materials, the system enables selection of a press compensation curve that adjusts for the variables associated with a particular set of press conditions. While it is possible to exactly fit a curve to any limited number of data points, the mechanism of this invention is to match a pre-determined curve to the limited number of data points. In this regard, the invention relates to curve matching, as shown in FIG. 10, not curve fitting as shown in FIG. 9.

Each pre-determined curve relates to a contrast profile and a midpoint magnitude value. In the exemplary embodiment described herein, each curve is given an alphanumeric identifier that is reflective of the contrast profile family and midpoint magnitude value. In the exemplary embodiment shown in FIG. 1, the curve set comprises eight contrast profile families (A-H, with H being highest contrast) and 51 midpoint magnitude values (20-70, with 70 being highest midpoint magnitude). Thus, for the embodiment shown in FIG. 1, there are 408 pre-determined curve choices, representing all combinations of the letters A-H and the numbers 20-70. Although this example uses eight letters and 51 numbers, the invention is not limited to use of only numbers or letters, nor the use of only eight contrast profile families and 51 midpoint magnitude values. Larger or smaller selection ranges for contrast and midpoint magnitude may be used.

Typically, at least three contrast profile families and more typically at least five contrast profile families are provided. If the range of contrast profile families exceeds 26, designations such as AA and AB, etc. may be used in a letter-based nomenclature. Typically, no more that 50 contrast profile families are used, and more typically no more than 20 contrast profile families or, ideally, no more than 10 contrast profile families. The same applies for the range of midpoint magnitude numbers to be used. Although the exemplary embodiment discussed herein includes member curves representing midpoint magnitudes for all integers in the range from 20 to 70, the range may have at its lower limit any number greater than zero, and as its upper limit any number less than 100, and less than all of the integers in the range (or non-integers in the range) may be included. Typically the number of curves is selected to provide a spread of curves that will provide a curve with acceptable tolerances to compensate for any set of press conditions. In the exemplary embodiment described herein, the curve set consists of 408 curves.

The contrast profile families of curves (A-H) are characterized by different shapes and slopes. The system is designed to provide a sufficient variety of curve shapes to cover most conceivable printing conditions.

Figure 2:
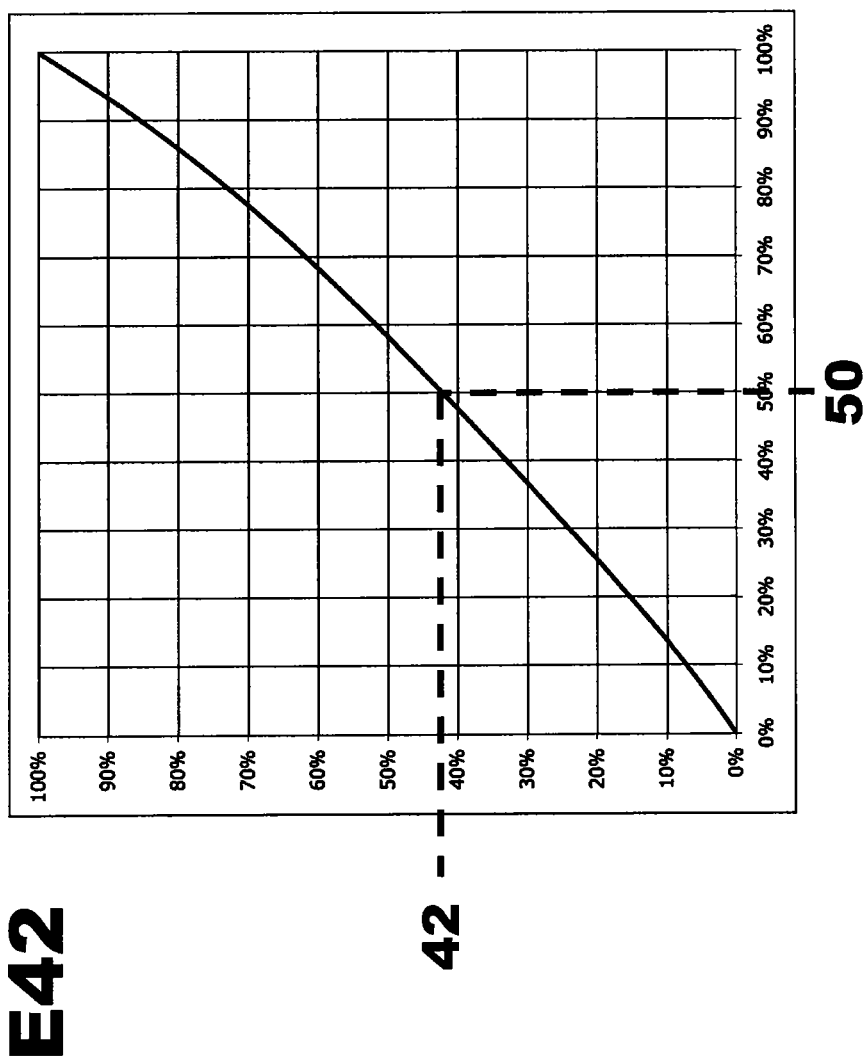
FIG. 2 is a graph of an exemplary curve identified as E42.
Figure 3:
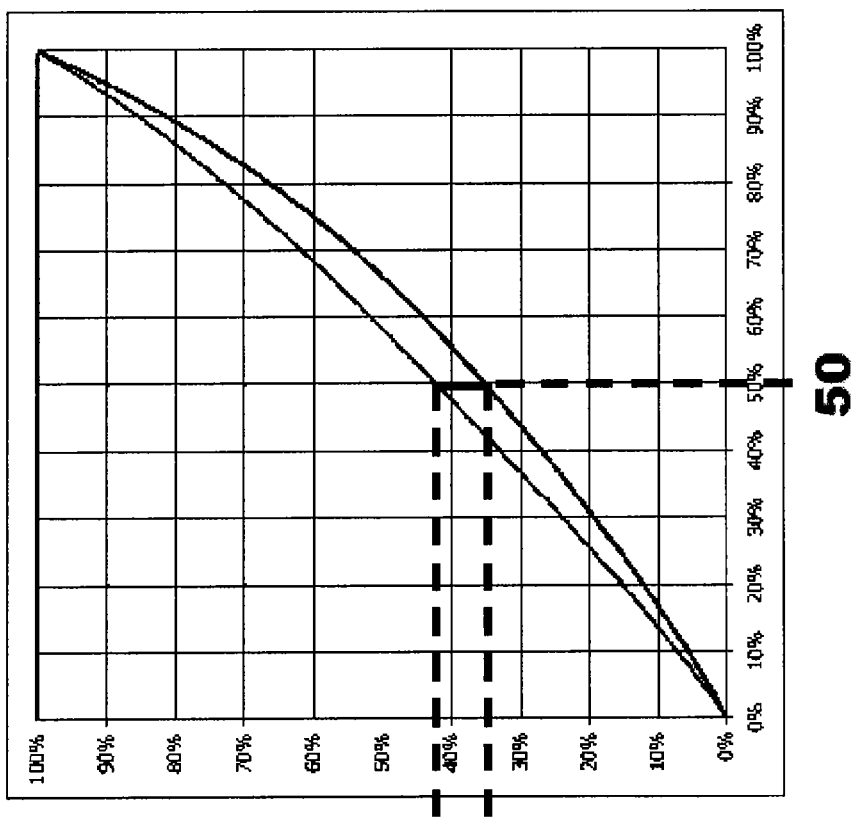
FIG. 3 is a graph of two exemplary curves identified as E35 and E42.
Figure 4:
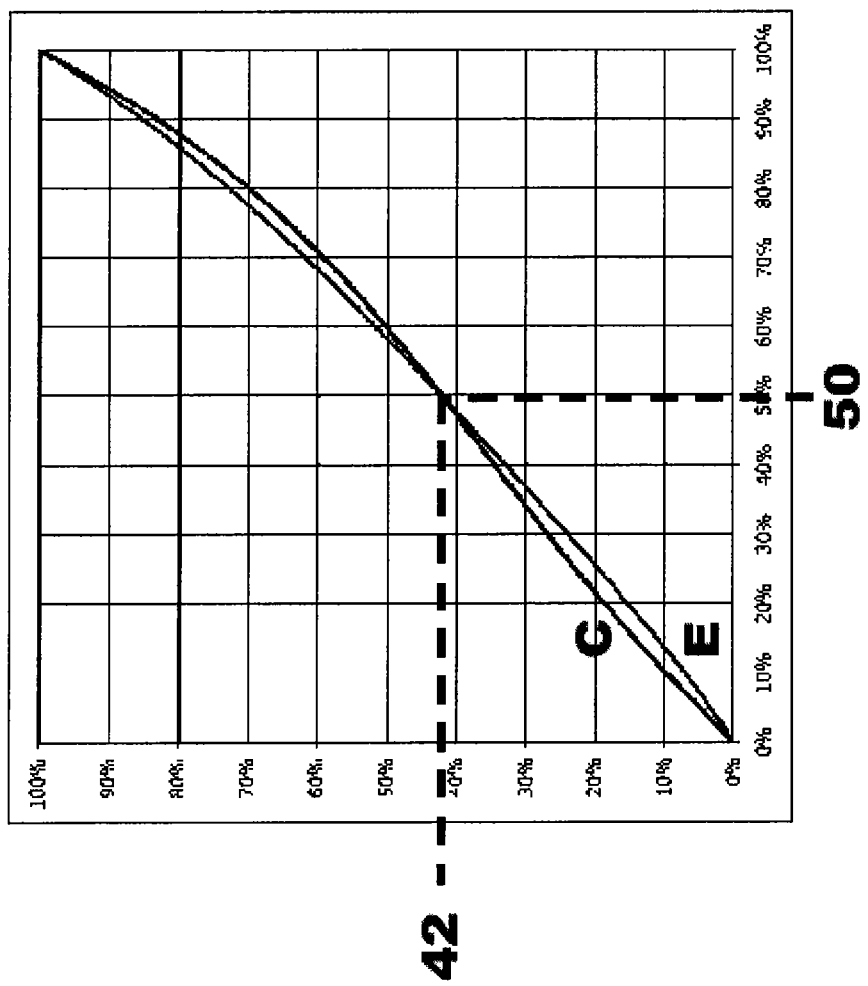
FIG. 4 is a graph of two exemplary curves identified as C42 and E42.
Figure 5A:
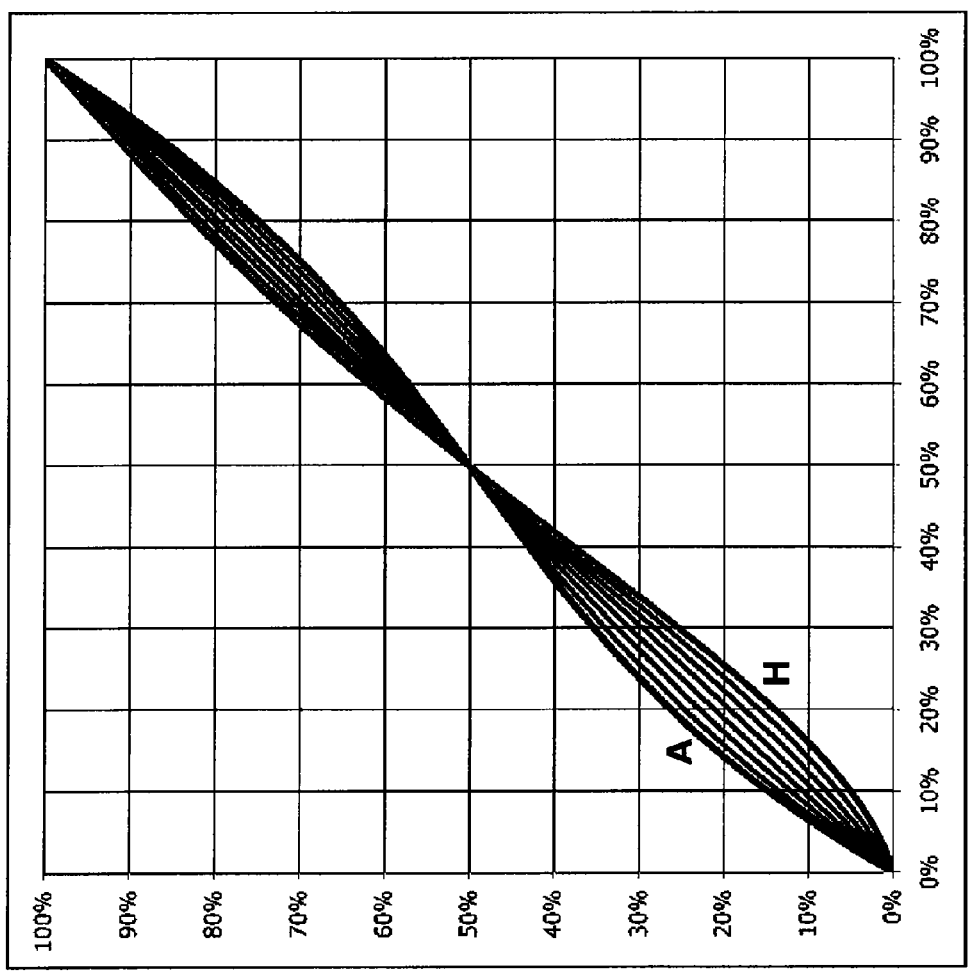
FIG. 5A is a graph of eight exemplary curves identified as A50, B50, C50, D50, E50, F50, G50 and H50.
Figure 5B:
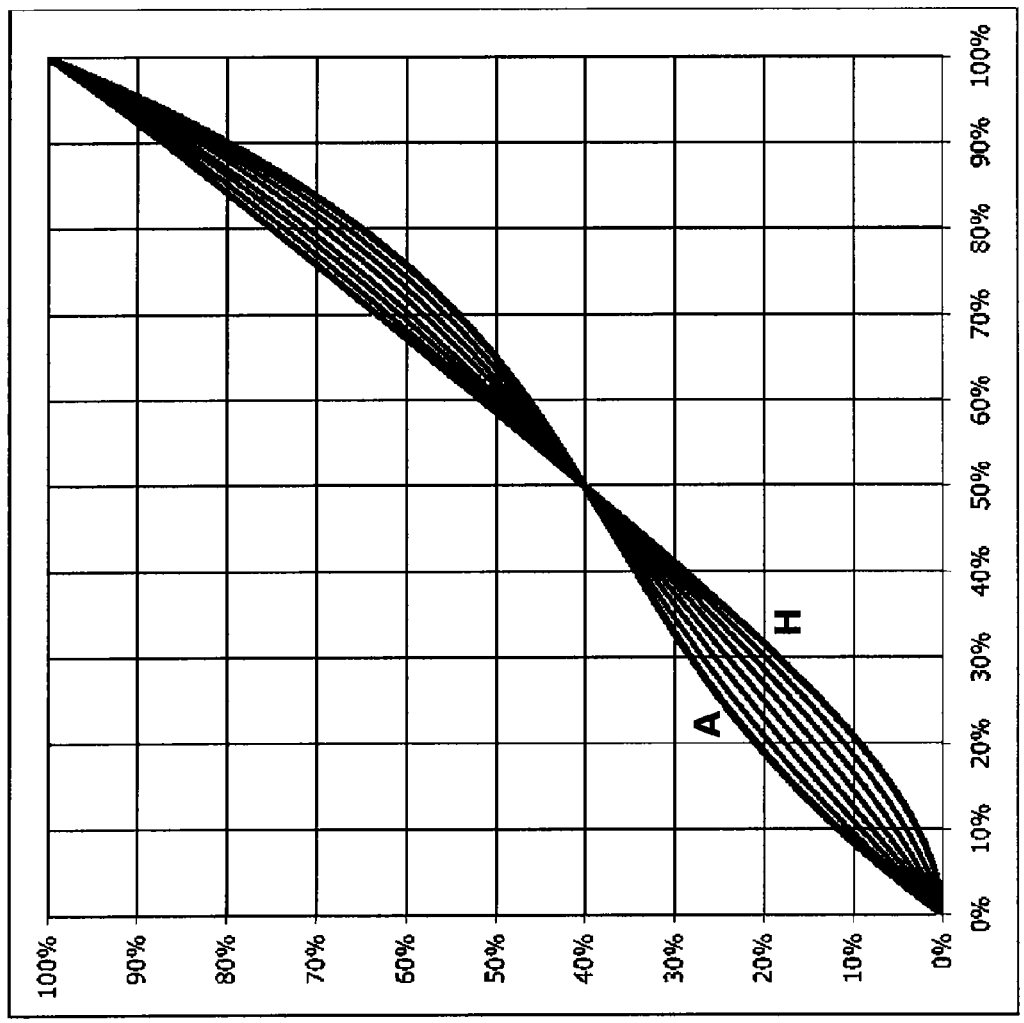
FIG. 5B is a graph of eight exemplary curves identified as A40, B40, C40, D40, E40, F40, G40 and H40.
Figure 5C:
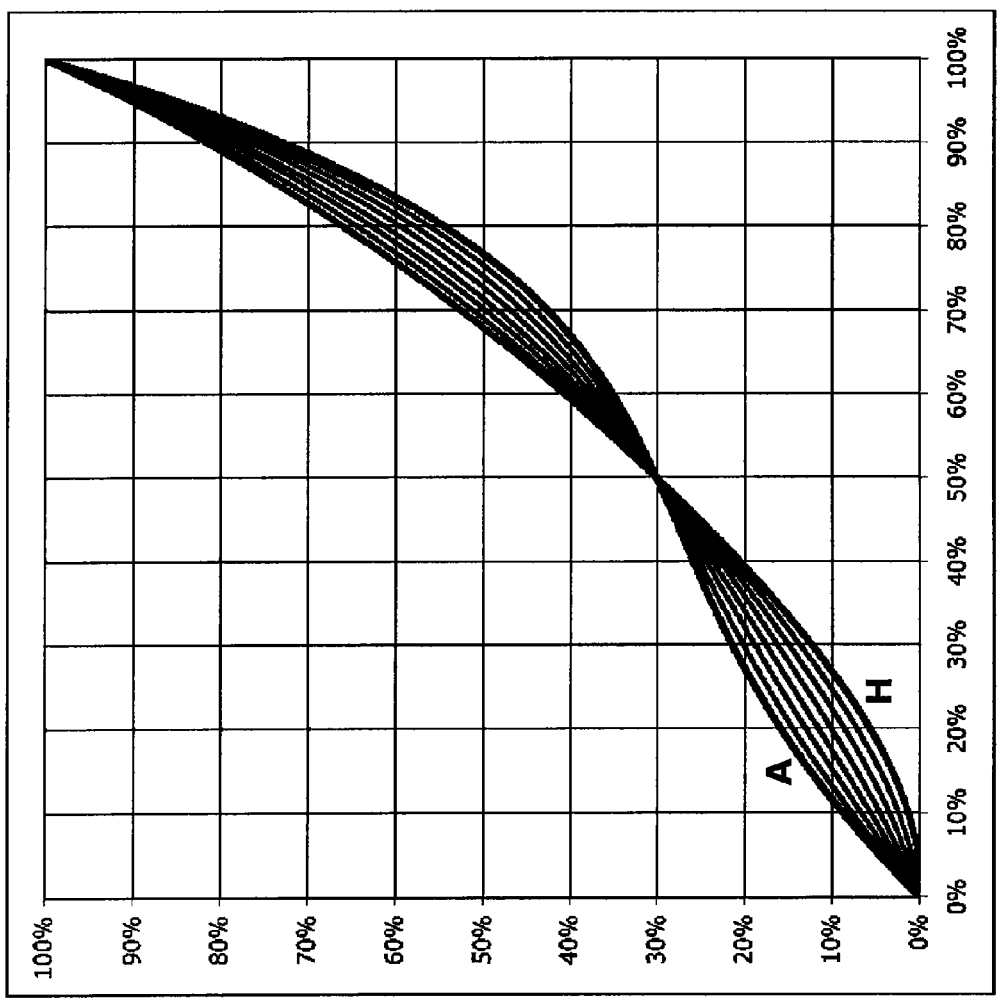
FIG. 5C is a graph of eight exemplary curves identified as A30, B30, C30, D30, E30, F30, G30 and H30.
Figure 6:
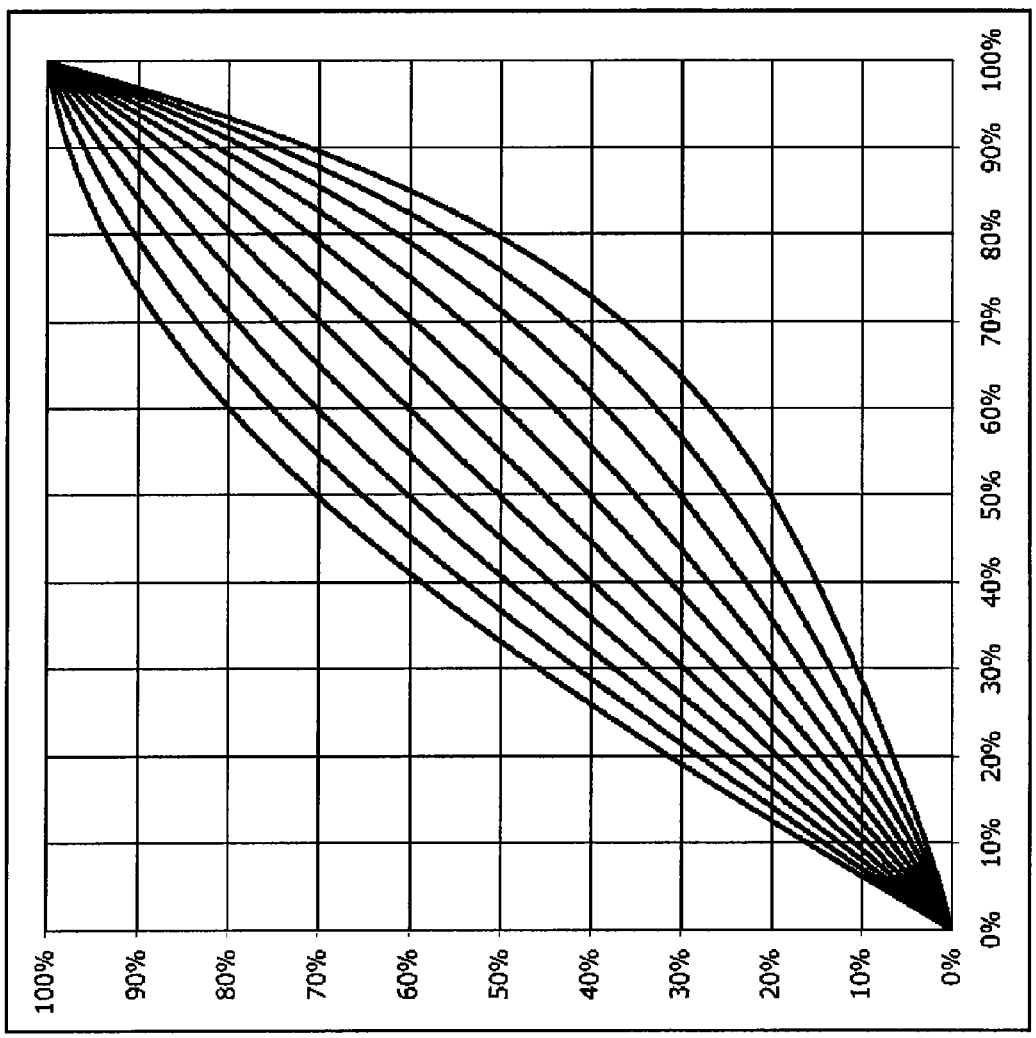
FIG. 6 is a graph of eleven exemplary curves identified as E20, E25, E30, E35, E40, E45, E50, E55, E60, E65 and E70.

FIG. 2 shows an example of the pre-press curve that has been assigned the identifier of E42. E42 is a medium contrast curve (near the middle of the letters between A-H) with the magnitude at 50% on the X-axis (50% desired color density), referred to herein as the midpoint magnitude, corresponding to 42% on the Y-axis (dot-size reduced on the printing plate to 42% of the maximum). FIG. 3 shows an exemplary embodiment of curves E35 and E42, demonstrating that E curves have essentially the same general shape, but with the 50% value mapping to different Y-values consistent with the numerical nomenclature. FIG. 4 shows an exemplary embodiment of curves C42 and E42, showing that the shape and slope of the two curves varies between the C curve shape and the E curve shape, but that because both curves have a midpoint magnitude of 42, both are anchored at X-Y coordinate of 50,42. FIGS. 5A through 5C show the varying shapes and slopes of curves A through H at magnitudes of 50, 40 and 30 respectively. Furthermore, FIG. 6 shows an exemplary E curve at 5% midpoint magnitude intervals ranging from a minimum midpoint magnitude of 20% to a maximum midpoint magnitude of 70%.

The curve set consists of a series of curves created from a fourth order polynomial of the form:

$$Y = bx + cx^2 + dx^3 + ex^4$$

A constant is not provided because the Y intercept for each curve is always 0. Each curve is fit to five points, x=0%, x=10%, x=50%, x=75% and x=100%. The values of Y at x=0% and x=100% are always anchored at 0% and 100% respectively. In the exemplary embodiment, the 50% value determines the numerical value of the alphanumeric identifier. For example, on the E42 curve shown in FIG. 1, entering x=50% into the fourth order polynomial gives Y=42%. The x=10% and x=75% values determine the shape and slope of the curve as further described below.

Figure 7A:
FIG. 7A is a graph of seven exemplary 10% derivative curves.
Figure 7B:
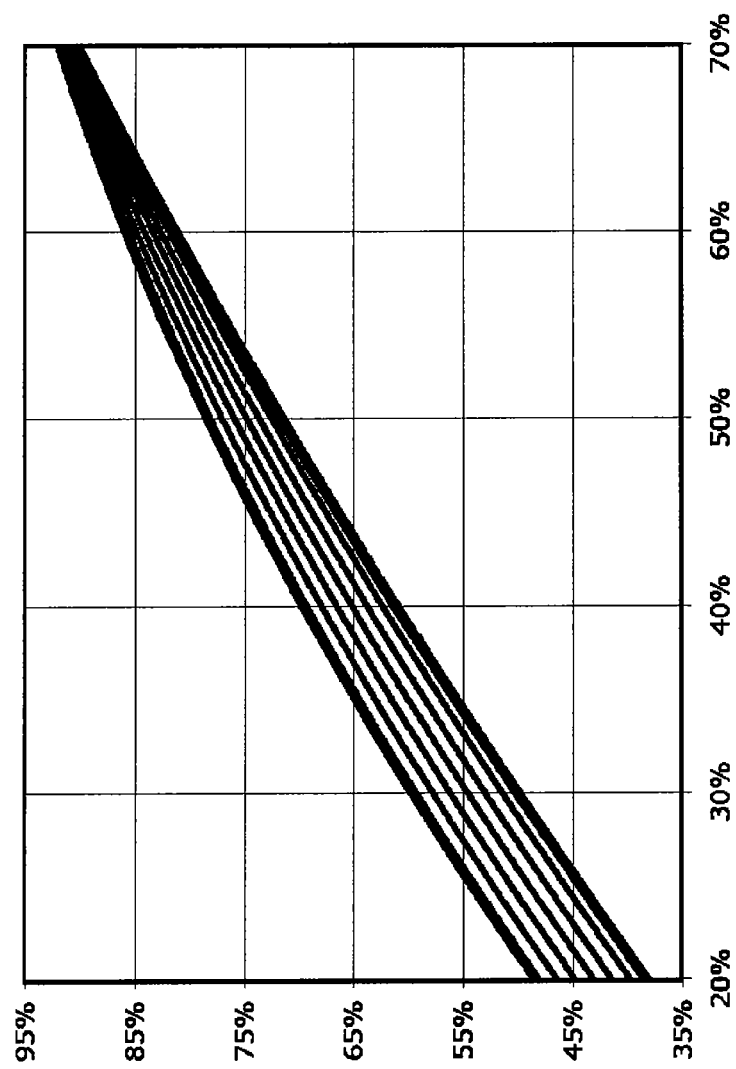
FIG. 7B is a graph of seven exemplary 75% derivative curves.
Figure 8:
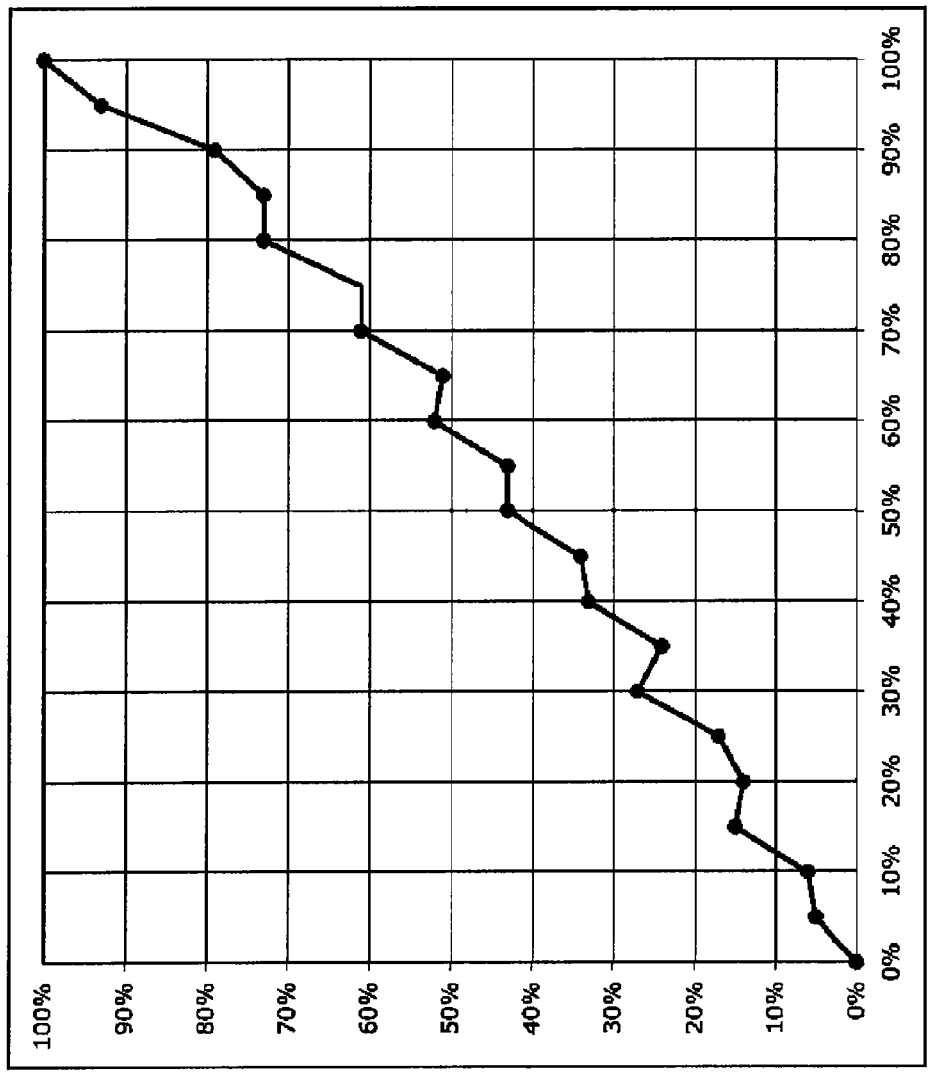
FIG. 8 depicts a series of X-Y points of a calibration curve plotted according to experimental results, in accordance with the prior art.

A 10% derivation function expresses the Y value of a curve as a function of the midpoint magnitude for that curve. Similarly, the 75% derivation function expresses the Y value of a curve as a function of the midpoint magnitude for that curve. The derivation functions themselves are second order polynomials of the format:

$$Y = k_1 x^2 + k_2 x + C$$

evenly spaced between the A through H curves, wherein in the exemplary embodiment, $k_1$, $k_2$, and C are as shown in Tables 7A and 7B. FIG. 7A and FIG. 7B are exemplary graphical representations of curves calculated by an exemplary 10% derivation function and an exemplary 75% derivation function, respectively.

Thus, for example, in one exemplary embodiment, the 10% value for the D40 curve is generated by plugging 40% into the above polynomial using the coefficient and constant values for $k_1$, $k_2$, and C as provided for the D family in Table 7A, and the 75% value for the D40 curve is generated by plugging 40% into the above polynomial using the coefficient and constant values for $k_1$, $k_2$, and C as provided for the D family in Table 7B.

TABLE 7A

10% Derivation Function Coefficients and Constant

| Curve Family | $X^2$ | X | C |
|---|---|---|---|
| A | 0.1296 | 0.1967 | 0.0168 |
| B | 0.1556 | 0.1611 | 0.0146 |
| C | 0.1852 | 0.1204 | 0.0135 |
| D | 0.2148 | 0.0796 | 0.0125 |
| E | 0.2444 | 0.0389 | 0.0114 |
| F | 0.2667 | 0.0067 | 0.0080 |
| G | 0.2963 | −0.0341 | 0.0070 |
| H | 0.3259 | −0.0748 | 0.0059 |

TABLE 7B

75% Derivation Function Coefficients and Constant

| Curve Family | $X^2$ | X | C |
|---|---|---|---|
| A | −0.2889 | 1.3322 | 0.1046 |
| B | −0.3407 | 1.3519 | 0.1193 |
| C | −0.3852 | 1.3630 | 0.1358 |
| D | −0.4296 | 1.3741 | 0.1524 |
| E | −0.5037 | 1.4126 | 0.1646 |
| F | −0.5333 | 1.4133 | 0.1817 |
| G | −0.5778 | 1.4244 | 0.1982 |
| H | −0.6222 | 1.4356 | 0.2149 |

The 408 press curves are derived, such as by a programmed computer by first calculating the 10% and 75% values using the 10% and 75% derivation functions for the selected curve family (such as A through H) for each member curve (for example 20 through 70). Next, the fourth order polynomial is mathematically exactly fit to the five standard points (x=0%, x=10%, x=50%, x=75% and x=100%) defined by the combination of boundary conditions (0,0 and 100,100), the given parameter X=50, Y=midpoint magnitude of the curve, and derived points from the 10% and 75% derivation functions as described above. The algorithms, including software for programming a computer to use such algorithms, required for deriving the fourth order polynomials to fit 5 points, such as least squares regression analysis, are well known. Using the fourth-order polynomials so derived, any point along the curve can then be calculated.

There are numerous ways to find the right curve to apply for a given set of conditions. One way to select a curve is to match any specification, including GRACoL G7 GRACoL 7, SWOP, or other specification designed by the user. The user can also take a custom curve with a plurality of x, y value data points made from any other system such as IdeaLink™, sold by IDEAlliance of Alexandria, Va., and, using appropriate software, find the closest curve from a plurality of synchronized curves in accordance with this invention. The algorithms, including software for programming a computer to use such algorithms, for matching existing curves to a limited set of points or to another curve are known. Such algorithms may simply check all available curves compared to the data, calculate the deviation between each point and the curves for all of the available curves, and select the one with the least total deviation as the closest match. Such algorithms may, for example, quantify the deviation in terms of absolute value or in terms of the squared difference, but the invention is not limited to any particular algorithm.

Another way to select a curve is for the user to print a target, such as EskoArtwork's Universal 4c Target™, and find the best curve match with associated software, such as EskoArtwork FastMatch™ software. Through as few as eight measurements, the user can find the best curve from any set of predetermined curves, such as a set of synchronized curves in accordance with the invention, for each of the four (or more) process colors. The curve thus identified can be directly input into associated software, for example that provided with EskoArtwork's Nexus™ software package. In the exemplary embodiment, the set of pre-determined curves is logical and therefore can be averaged by both variables, and the curves are naturally biased, such that the difference in contrast families is slightly larger than the difference between curve magnitudes so that curves for different colors (C, M, Y, and K) are likely to have the same contrast even if they have different magnitudes. This is consistent with industry findings that it is more important to have the color "balanced" than to have it be the exactly correct "lightness".

On-Going Curve Adjustment

A significant advantage of using standard curves according to the invention is the simplicity of making on-going curve adjustments. If presses are regularly printing too lightly, the operator may merely increase the curve number corresponding to a higher midpoint magnitude. If the contrast is too high, the operator may decrease the curve letter. Assessments can be made visually or quantitatively through measurement of the press control strip. All the user needs to know is the standard curve used for the job. If the user has data from multiple press runs, it may be useful to average them together. While normal curves may be difficult to average, the task is easy with the predetermined curves according to the invention. For example, the average of D-43 and F-37 is E-40.

Thus, the methods of this invention, and associate nomenclature simplify curve averaging and adjustment.

Improve Color Management

The methods of this invention may be used either "stand-alone" or to complement color management. International Color Consortium (ICC) profiles are more accurate when the correct curves are applied to the press ICC profile test run. What's less commonly known, however, is that if press conditions change, the ICC profiles must typically be re-made. The use of pre-determined curves according to the invention eliminates this need. Through the use of conversion curves, an ICC profile can be edited in minutes to accommodate a change in press conditions, thereby minimizing on-press testing. For example, if press testing is done using an E42 profile, the user might, upon evaluating the run, conclude that an E35 profile would have been better. By mathematically generating a conversion curve that accounts for the differences between E42 and E35, the ICC profile can be adjusted so as to be a proper match for running under E35 conditions, without having to make actual test press runs under those conditions.

In one exemplary embodiment, to achieve proper color management if there is an advanced screening, a user may conduct a single color test. The user may then properly calibrate the plate using standard plate calibration programming. Next the user may run a 4c test to further determine the accuracy of the color. Finally, to achieve maximum color accuracy the user can run an ICC profile target and make ICC profiles.

Control Theory for Press Operation

Using synchronized curves such as those of the present invention facilitate the use of proper control theory with respect to a printing operation as a whole. A press operator using synchronized curves and measuring every plate and every press run to provide feedback, can make minimal adjustments by selecting curves from the families of curves that are only slightly varied (typically only in magnitude) from those previously used, only when the actual results exceed some threshold window of acceptability. Thus, instead of press operators constantly choosing different unsynchronized or "custom" pre-press curves representing exact mathematical fits of actual data, which can introduce more variability, press operators can choose different curves within a same family of curves, thereby introducing only small perturbations in the system.

It should be understood that a computer may be specifically programmed with specific instructions, such as through software, to carry out some or all of the method steps of this invention. This specifically programmed computer may be integrated with a printing press or imagesetter for storing the predetermined synchronized curves, selecting the predetermined curve that is a best fit to a set of data, and applying the selected curve to the digital image prior to sending the image to an imagesetter for making plates usable by the printing press. The integration with an imagesetter and/or printing press may be over communication links, or a physical integration.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A method for adjusting color tones of an input digital image file to create an adjusted digital image file, using a computer system programmed with instructions for selecting curves that are a best fit to data, the steps comprising:

a) storing on the computer system a plurality of predetermined curves comprising a plurality of contrast profile families of curves, each contrast profile family of curves comprising a plurality of member curves, each member curve having a different midpoint magnitude, each of said curves specifying an adjusted color tone percentage output as a function of input color tone percentage over a range of input and output values, each of said curves reflecting a midpoint magnitude and contrast over the range of input and output values, the midpoint magnitude comprising the adjusted color tone percentage output corresponding to an input color tone percentage of 50%, each curve representing a combination of midpoint magnitude and contrast that is different from the combination for any other curve in the plurality of curves;

b) receiving as an input into the computer system at least two data points, each data point comprising an adjusted color tone percentage output corresponding to an input color tone percentage; and c) determining which one of the plurality of predetermined curves most closely matches said at least two data points, thereby identifying a selected curve to be applied for adjusting the color tones of the input digital image file to create the adjusted digital image file.

2. The method of claim 1, wherein the adjusted color tone percentage corresponds to a percentage of maximum dot size on a printing plate.

3. The method of claim 1, wherein each curve corresponds to a fourth order polynomial.

4. The method of claim 1, wherein each curve is identified by a curve identifier comprising a first portion corresponding to the contrast profile family of curves and a second portion corresponding to the midpoint magnitude of the curve.

5. The method of claim 1, wherein each contrast profile family of curves has a corresponding 10% derivation function and a corresponding 75% derivation function, each derivation function comprising a second order polynomial, each curve in the contrast profile family of curves generated to be a perfect fit to the following X-Y points: (a) 0%, 0%; (b) 100%, 100%; (c) X=50%, Y equal to the midpoint magnitude of the curve, (d) X=10%, Y calculated using the 10% derivation function using the midpoint magnitude of the curve as the input to the 10% derivation function; and (e) X=75%, Y calculated using the 75% derivation function using the midpoint magnitude of the curve as the input to the 75% derivation function.

6. The method of claim 1, comprising 3 to 50 contrast profile curve families.

7. The method of claim 1, comprising 5 to 20 contrast profile curve families.

8. The method of claim 1, comprising 5 to 10 contrast profile curve families.

9. The method of claim 4, wherein the portion of the identifier corresponding to the midpoint magnitude comprises an integer in the range of 20 to 70.

10. The method of claim 9, comprising eight contrast profile curve families.

11. The method of claim 10, wherein each contrast profile curve family comprises a 51 member curves, one for each integer in the range of 20 and 70.

12. The method of claim 1, wherein the step of determining which one of the plurality of predetermined curves most closely matches said at least two data points is performed by the computer system.

13. The method of claim 1, wherein the computer system is further programmed with instructions for applying selected curves to adjust data values in digital image files, the method further comprising d) receiving the input digital image file as an input into the computer system; and
e) applying via the computer system the selected curve to the input digital image file to produce the adjusted digital image file.

14. The method of claim 1, further comprising providing a user interface configured to permit a user to select a curve from the plurality of predetermined curves.

15. The method of claim 14, further comprising printing a first printed image from a first adjusted digital image file created using a first selected curve, receiving user input via the user interface identifying a second selected curve, and printing a second printed image from a second adjusted digital image file using the second selected curve.

16. The method of claim 13, further comprising printing a printed image from the adjusted digital image file.

17. The method of claim 13, further comprising producing a printing plate from the adjusted digital image file.

18. The method of claim 17, wherein the selected curve optimizes the adjusted digital image file for a given set of printing conditions.

19. A method for adjusting color tones of an input digital image file to create an adjusted digital image file using a computer system programmed with instructions for identifying curves that are a best fit to data and for applying selected curves to adjust data values in digital image files, the steps comprising:
a) storing on the computer system a plurality of predetermined curves, each of said curves specifying an adjusted color tone percentage output as a function of input color tone percentage over a range of input and output values, each of said curves reflecting a midpoint magnitude and contrast over the range of input and output values, the midpoint magnitude comprising the adjusted color tone percentage output corresponding to an input color tone percentage of 50%, each curve representing a combination of midpoint magnitude and contrast that is different from the combination for any other curve in the plurality of curves;
b) receiving as an input into the computer system at least two data points, each data point comprising an adjusted color tone percentage output corresponding to an input color tone percentage;
c) determining which one of the plurality of predetermined curves most closely matches said at least two data points, thereby identifying a first selected curve;
e) applying via the computer system the first selected curve to the input digital image file to produce a first adjusted digital image file;
f) printing a printed image from the adjusted digital image file pursuant to a set of printing conditions;
g) receiving measurements of the printed image as an input into the computer;
h) identifying a second selected curve from the predetermined plurality of curves based upon the measurements; and
i) applying via the computer system the second selected curve to the input digital image file to produce a second adjusted digital image file, wherein the second selected curve optimizes the adjusted digital image file for the set of printing conditions.

20. A system comprising a computer system programmed with instructions for adjusting color tones of an input digital image file to create an adjusted digital image file, the computer system comprising:
computer memory means for storing a plurality of predetermined curves comprising a plurality of contrast profile families of curves, each contrast profile family comprising a plurality of member curves, each member curve having a different midpoint magnitude, each of said curves specifying an adjusted color tone percentage output as a function of input color tone percentage over a range of input and output values, each of said curves reflecting a midpoint magnitude and contrast over the range of input and output values, the midpoint magnitude comprising the adjusted color tone percentage output corresponding to an input color tone percentage of 50%, each curve representing a combination of midpoint magnitude and contrast that is different from the combination for any other curve in the plurality of curves;
computer input means for receiving an input of at least two data points, each comprising an adjusted color tone percentage and an input color tone percentage;
computer processing means for determining which one of the plurality of stored predetermined curves most closely matches said at least two data points, thereby identifying a selected curve.

21. The system of claim 20, wherein the each of the stored curves corresponds to a fourth order polynomial.

22. The system of claim 20, wherein each family of curves has a corresponding 10% derivation function and a corresponding 75% derivation function, each derivation function comprising a second order polynomial, each curve in the family of curves generated to be a perfect fit to the following X-Y points: (a) 0%, 0%; (b) 100%, 100%; (c) X=50%, Y equal to the midpoint magnitude of the curve, (d) X=10%, Y calculated using the 10% derivation function using the midpoint magnitude of the curve as the input to the 10% derivation function; and (e) X=75%, Y calculated using the 75% derivation function using the midpoint magnitude of the curve as the input to the 75% derivation function.

23. The system of claim 20, comprising 5 to 10 contrast profile families of curves, wherein the member curves in each family represent a plurality of midpoint magnitudes corresponding to integers in the range of 20 to 70.

24. The system of claim 20 further comprising an imagesetter integrated with the computer system, the imagesetter comprising means for producing a printing plate from the adjusted digital image file.

25. The system of claim 20 further comprising a printing press integrated with at least the computer system, the printing press comprising means for producing a printed image from the adjusted digital image file.

26. The system of claim 20, further comprising:
computer processing means for applying the selected curve to the input digital image file to produce the adjusted digital image file.

27. The system of claim 20, further comprising:
means for printing an image from the adjusted digital image file;
wherein the computer system further comprises:
computer input means for receiving measurements of the printed target as an input into the computer system;
computer processing means for identifying a second selected curve from the predetermined set of curves based upon the measurements; and
computer processing means for applying the second selected curve to the input digital image file to produce another adjusted digital image file.

28. A system comprising a computer system programmed with instructions for adjusting color tones of an input digital image file to create an adjusted digital image file, the computer system comprising:

computer memory means for storing a plurality of predetermined curves, each of said curves specifying an adjusted color tone percentage output as a function of input color tone percentage over a range of input and output values, each of said curves reflecting a midpoint magnitude and contrast over the range of input and output values, the midpoint magnitude comprising the adjusted color tone percentage output corresponding to an input color tone percentage of 50%, each curve representing a combination of midpoint magnitude and contrast that is different from the combination for any other curve in the plurality of curves;

computer input means for receiving an input of at least two data points, each comprising an adjusted color tone percentage and an input color tone percentage;

computer processing means for determining which one of the plurality of stored predetermined curves most closely matches said at least two data points, thereby identifying a selected curve;

computer processing means for applying the selected curve to the input digital image file to produce the adjusted digital image file; and a user interface for permitting a user to select a curve from the plurality of curves through identification of a curve identifier, the curve identifier comprising a first portion corresponding to the selected curve family, and a second portion corresponding to the midpoint magnitude.

29. A method for adjusting color tones of an input digital image file to create an adjusted digital image file using a computer system programmed with instructions for applying selected curves to adjust data values in digital image files, the steps comprising:

a) storing on the computer system a plurality of predetermined curves comprising multiple contrast profile families of curves, each contrast profile family of curves comprising a plurality of member curves each having a different midpoint magnitude, each of said curves specifying an adjusted color tone percentage output as a function of input color tone percentage over a range of input and output values, each of said curves reflecting a midpoint magnitude and contrast over the range of input and output values, the midpoint magnitude comprising the adjusted color tone percentage output corresponding to an input color tone percentage of 50%, each curve representing a combination of midpoint magnitude and contrast that is different from the combination for any other curve in the plurality of curves;

b) receiving the input digital image file as an input into the computer system;

c) providing on the computer system a user interface configured to permit user selection of a curve from the plurality of curves; and d) applying via the computer system a selected curve to the input digital image file to produce the adjusted digital image file.

30. The method of claim 29, further comprising:

e) printing a first printed image from a first adjusted digital image file created using a first selected curve, f) identifying a second selected curve, and g) printing a second printed image from a second adjusted digital image file using the second selected curve.

31. The method of claim 30, wherein the second selected curve optimizes the adjusted digital image file for a given set of printing conditions on a printing press.

32. The method of claim 30, wherein the step of identifying the second selected curve comprises receiving an identification of the second selected curve via the user interface.

33. The method of claim 30, wherein the computer is further programmed with instructions for selecting curves that are a best fit to data, and the step of identifying the second selected curve comprises the steps of:

receiving measurements of the first printed image as an input into the computer system; and identifying, using the computer system, the second selected curve from the predetermined set of curves based upon the measurements.

34. The method of claim 29, further comprising producing a printing plate from the adjusted digital image file.

35. A non-transitory computer readable medium comprising computer-readable code for adjusting color tones of an input digital image file to create an adjusted digital image file, the code comprising instructions for performing the steps of:

a) storing on a computer a plurality of predetermined curves comprising a plurality of contrast profile families of curves, each contrast profile family of curves comprising a plurality of member curves, each member curve having a different midpoint magnitude, each of said curves specifying an adjusted color tone percentage output as a function of input color tone percentage over a range of input and output values, each of said curves reflecting a midpoint magnitude and contrast over the range of input and output values, the midpoint magnitude comprising the adjusted color tone percentage output corresponding to an input color tone percentage of 50%, each curve representing a combination of midpoint magnitude and contrast that is different from the combination for any other curve in the plurality of curves;

b) receiving as a computer input at least two data points, each data point comprising an adjusted color tone percentage output corresponding to an input color tone percentage; and c) determining which one of the plurality of predetermined curves most closely matches said at least two data points, thereby identifying a selected curve to be applied to the input digital image file to create an adjusted digital image file.

36. The non-transitory computer readable medium of claim 35, further comprising instructions for:

d) applying a selected curve to the input digital image file to produce the adjusted digital image file.

37. The non-transitory computer readable medium of claim 36, further comprising instructions for creating a printing plate based upon the adjusted digital image file.

38. The non-transitory computer readable medium of claim 35, further comprising instructions for providing a user interface configured to permit selection of a curve from the plurality of curves.

39. The non-transitory computer readable medium of claim 35, wherein the computer-readable code further comprises instructions for performing the steps of:

e) printing a first printed image from the adjusted digital image file;

f) receiving measurements of the printed image as a computer input;

g) identifying a second selected curve from the predetermined set of curves based upon the measurements; and h) applying the second selected curve to the input digital image file to produce another adjusted digital image file.

* * * * *

UNITED STATES PATENT AND TRADEMARK OFFICE
CERTIFICATE OF CORRECTION

PATENT NO. : 8,717,627 B2  Page 1 of 1
APPLICATION NO. : 13/062668
DATED : May 6, 2014
INVENTOR(S) : Mark Samworth It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 427 days.

Signed and Sealed this

Twenty-ninth Day of September, 2015

Michelle K. Lee
*Director of the United States Patent and Trademark Office*